(12) United States Patent
Takai

(10) Patent No.: US 6,326,076 B1
(45) Date of Patent: Dec. 4, 2001

(54) CORROSION-RESISTANT COMPOSITE OXIDE MATERIAL

(75) Inventor: Yasushi Takai, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/468,304

(22) Filed: Dec. 21, 1999

(30) Foreign Application Priority Data

Dec. 21, 1998 (JP) .................................................. 10-362257

(51) Int. Cl.[7] .............................. B32B 3/26; C04B 35/50; C07K 1/00

(52) U.S. Cl. .................................... 428/312.6; 428/313.9; 428/319.1; 501/127; 501/152; 106/287.18

(58) Field of Search .............................. 428/312.6, 313.9, 428/319.1; 501/127, 152; 106/287.18

(56) References Cited

U.S. PATENT DOCUMENTS

| 5,200,374 | * | 4/1993 | Yamada et al. . |
| 5,426,084 | * | 6/1995 | Fukaya et al. . |
| 5,573,862 | * | 11/1996 | Gualtieri et al. . |
| 5,805,973 | * | 9/1998 | Coffinberry et al. . |
| 5,843,372 | * | 12/1998 | Hasebe et al. . |
| 5,902,763 | * | 5/1999 | Waku et al. . |
| 5,981,415 | * | 11/1999 | Waku et al. . |
| 6,139,983 | * | 10/2000 | Ohashi et al. . |
| 6,200,918 | * | 3/2001 | Yanagitani et al. . |

FOREIGN PATENT DOCUMENTS

| 62223009-A | * | 10/1987 | (JP) . |
| 05085821-A | * | 4/1993 | (JP) . |
| 06052599-A | * | 9/1995 | (JP) . |
| 10-45461 | | 2/1998 | (JP) . |
| 10-45467 | | 2/1998 | (JP) . |

* cited by examiner

Primary Examiner—Blaine Copenheaver
Assistant Examiner—Hai Vo
(74) Attorney, Agent, or Firm—Wenderoth, Lind & Ponack, LLP

(57) ABSTRACT

Disclosed is a corrosion-resistant material capable of withstanding attack of a halogen-containing corrosive gas such as sulfur hexafluoride or a plasma thereof. The corrosion-resistant material is characterized in that at least the surface layer thereof is formed from a sintered body of a composite oxide having a crystalline structure of garnet and having a composition expressed by the formula $Ln_3Al_5O_{12}$, in which Ln is a rare earth element or a combination of rare earth elements selected from the group consisting of dysprosium, holmium, erbium, thulium, ytterbium and lutetium, the material having a surface roughness Ra not exceeding 1 $\mu$m and the sintered body having a porosity not exceeding 3%.

2 Claims, No Drawings

CORROSION-RESISTANT COMPOSITE OXIDE MATERIAL

BACKGROUND OF THE INVENTION

The present invention relates to a novel corrosion-resistant composite oxide material or, more particularly, a corrosion-resistant material of which at least the surface layer is formed from a sintered body of a unique composite oxide having extremely high corrosion resistance against an atmosphere of a halogen-containing corrosive gas or a plasma of such a gas.

As is well known, the manufacturing process of various semiconductor devices involves a step of dry etching or a dry-process formation of a thin film on a substrate surface which is conducted sometimes by using a highly reactive and highly corrosive halogen-containing gas such as chlorine- and/or a fluorine-containing gas, referred to as a processing gas hereinafter, in a chamber for plasma generation in some cases.

In consideration of the good corrosion resistance of the material, a silica-based material or silicon carbide-based material is used as a material for forming parts of the plasma instrument or apparatus coming into contact with such a highly corrosive atmosphere including, for example, inner walls of the plasma chamber and various jigs such as holders to support a semiconductor silicon wafer, protective covers, insulation rings and the like.

Along with the increase of demand in recent years for a higher and higher degree of integration in semiconductor devices, the process of dry etching and/or thin-film formation is conducted, as a recent trend, by using a halogen-containing processing gas which is more reactive and hence more corrosive than the processing gases used before.

The shift of the processing gas toward more corrosive ones necessarily causes a problem that the apparatus walls and tools made from a silica-based or silicon carbide-based corrosion-resistant material can no longer withstand the attack of the atmosphere of such a processing gas having increased corrosiveness resulting in serious troubles in connection with the performance of the instrument or apparatus due to degradation of the surface nature such as, for example, a decrease in the transparency consequently decreasing the yield of acceptable products.

With an object to solve the above mentioned problems, a proposal is made in Japanese Patent Kokai 10-45461 for the use of certain composite oxide materials such as yttrium aluminum garnet of the composition formula $Y_3Al_5O_{12}$ and silicate compounds as a corrosion-resistant material capable of withstanding the halogen-containing processing gases and plasmas thereof having increased corrosiveness.

These newly proposed corrosion-resistant materials still have a problem that, due to the very high melting point of the materials, a corrosion-resistant sintered body of the material cannot be prepared unless the sintering temperature is increased so high as to cause a heavy increase in the manufacturing costs of the sintered material.

An alternative proposal is made also in Japanese Patent Kokai 10-45461 for the use of a fluoride compound as the constituent of a corrosion-resistant material as a whole which should withstand the attack of a halogen-containing corrosive gas such as fluorine-containing gases.

When a corrosion-resistant material is formed from a mixture of fluoride compounds according to the above mentioned proposal, such a material cannot be used at a temperature of several hundreds centigrade or higher because the melting point of such a fluoride mixture is so low. When a single kind of a fluoride compound such as yttrium fluoride is used as a material for forming a corrosion-resistant material, the fluoride compound is converted into the corresponding oxyfluoride at a temperature of 1000° C. or higher in the presence of even a trace amount of oxygen in the atmosphere so that full corrosion resistance can no longer be exhibited under such conditions.

SUMMARY OF THE INVENTION

The present invention accordingly has an object to provide a novel corrosion-resistant material capable of withstanding corrosive attack of any halogen-containing gases or plasma thereof at elevated temperatures even in the presence of oxygen in the atmosphere to overcome the above described disadvantages in the prior art.

Thus, the present invention provides a novel corrosion-resistant material of which at least the surface layer is formed from a sintered composite oxide having a crystalline structure of a rare earth aluminum garnet expressed by a composition formula $Ln_3Al_5O_{12}$, in which Ln is a rare earth element or a combination of rare earth elements selected from the group consisting of dysprosium, holmium, erbium, thulium, ytterbium and lutetium.

It is preferable that the above mentioned sintered composite oxide layer forming at least the surface layer of the inventive corrosion-resistant material should desirably have a porosity not exceeding 3%, the surface roughness Ra of the sintered composite oxide layer does not exceed 1 $\mu$m and the grains of the sintered composite oxide layer have a particle diameter not exceeding 50 $\mu$m.

DETAILED DESCRIPTION OF THE PREFERRED EMBODIMENTS

As is described above, the most characteristic feature of the inventive corrosion-resistant material is that at least the surface layer of the material is formed from a sintered composite oxide of a specific rare earth aluminum garnet having a crystalline structure of garnet, of which the composite oxide has a chemical composition of the formula $Ln_3Al_5O_{12}$, in which Ln is a rare earth element or a combination of rare earth elements selected from the group consisting of dysprosium, holmium, erbium, thulium, ytterbium and lutetium or, preferably, from the group consisting of erbium, thulium, ytterbium and lutetium.

The halogen-containing corrosive gas, which the corrosion-resistant material of the invention can withstand, includes fluorine-containing gases such as sulfur hexafluoride $SF_6$, nitrogen trifluoride $NF_3$, carbon tetrafluoride $CF_4$, fluoroform $CHF_3$, chlorine trifluoride $ClF_3$ and hydrogen fluoride HF, chlorine-containing gases such as chlorine $Cl_2$, boron trichloride $BCl_3$ and silicon tetrachloride $SiCl_4$, bromine-containing gases such as hydrogen bromide HBr and bromine $Br_2$ and iodine-containing gases such as hydrogen iodide HI. A halogen-containing plasma atmosphere can be generated by applying microwaves or high-frequency waves to an atmosphere of the above mentioned halogen-containing gases.

While the rare earth constituent Ln forming the sintered composite oxide of $Ln_3Al_5O_{12}$ can be any one or any combination of the rare earth elements including dysprosium, holmium, erbium, thulium, ytterbium and lutetium, it is preferable that the rare earth constituent Ln is selected from erbium, thulium, ytterbium and lutetium because these four rare earth elements each have an ionic radius smaller than that of yttrium which is used conventionally in a halogen-resistant anti-corrosion material and have lower basicity to exhibit very high corrosion resistance against halogen-containing corrosive gases. It is not always necessary that these four elements are used each in a high purity form but can be used as a mixture of the four elements so that the costs required for high-purity separation of the individual elements can be saved.

As is readily understood, the corrosion resistance of a corrosion-resistant material greatly depends on the surface area of the material coming into contact with the corrosive gas. In this regard, it is preferable that the surface roughness Ra of the corrosion-resistant material of the invention does not exceed 1 μm so that the surface area of the article can be kept so low. In other words, a value 1 μm of Ra serves as a measure of the surface area above which the corrosion resistance of the material would be adversely affected due to an increase in the surface area coming into contact with the corrosive atmosphere.

Further, it is desirable that the sintered composite oxide body forming at least the surface layer of the inventive corrosion-resistant material has a porosity not exceeding 3% in order to prevent localized proceeding of corrosion on the pore surfaces along with an effect of decreasing the surface roughness of the sintered body. When the porosity of the sintered body is too large, it may be the case that electric fields are concentrated at or in the vicinity of the pores in the surface layer to accelerate proceeding of corrosion and the surface roughness Ra of the sintered body can hardly be so low as to be 1 μm or smaller.

Though not so greatly, the corrosion resistance of the sintered composite oxide material against halogen-containing corrosive gases is affected by the grain size of the sintered composite oxide body. In consideration of the mechanical strengths of the sintered composite oxide body to ensure practical use thereof, however, it is desirable that the grains of the sintered body has a particle diameter not exceeding 50 μm since a great decrease is caused in the mechanical strength of the sintered body when the grain size thereof is too large.

The method for the preparation of the corrosion-resistant sintered composite oxide material of the invention is not particularly limitative. For example, a powder having a particle diameter of 0.1 to 5 μm obtained from a blend of the starting materials including aluminum oxide and a rare earth oxide in a stoichiometric proportion by co-melting followed by solidification by cooling and pulverization is compression-molded into a powder compact which is subjected to a sintering heat treatment at a temperature of 1300 to 1800° C. for 1 to 6 hours in vacuum or in an atmosphere of an inert gas to ensure a low porosity of the sintered body as desired followed by machining of the sintered body into the form of a desired material and grinding and polishing of the surface to ensure a desirable surface roughness.

The thus obtained sintered body is highly corrosion resistant against attack of a halogen-containing corrosive gas or plasma thereof so that the material is useful as a lining material on the surface coming into contact with such a corrosive atmosphere.

In the following, the corrosion-resistant sintered composite oxide material of the invention is illustrated in more detail by way of Examples and Comparative Examples, which, however, never limit the scope of the invention in any way.

EXAMPLE

Sintered composite oxide bodies of ytterbium aluminum garnet $Yb_3Al_5O_{12}$ and erbium aluminum garnet $Er_3Al_5O_{12}$ were prepared by sintering powder compacts of the respective composite oxide powders having an average particle diameter of 1.5 μm at a temperature of up to 1800° C. in vacuum or in an atmosphere of nitrogen or a mixture of nitrogen and hydrogen for 2 to 6 hours to give sintered bodies having a porosity of substantially 0% or about 2%, respectively, as calculated from the bulk density determined by the Archimedes' method and the true density of the respective garnets. These sintered bodies were mechanically ground and polished on the surface to give a surface roughness Ra of 0.1 μm or 0.8 μm for the ytterbium aluminum garnet samples and 0.1 μm or 0.7 μm for the erbium aluminum garnet samples.

These sintered and surface-polished composite oxide samples were exposed to a plasma atmosphere of sulfur hexafluoride gas for 2 hours in a plasma chamber of a RIE plasma apparatus to determine the weight decrease, from which the etching rate in nm/minute was calculated to give the results shown in Table 1 which also indicates the sintering conditions, i.e. temperature, time and atmosphere, surface roughness and porosity.

TABLE 1

| Sample | Sintering conditions | | | Surface | | Etching |
| --- | --- | --- | --- | --- | --- | --- |
| | Temperature, ° C. | Time, hours | Atmosphere | roughness Ra, μm | Porosity, % | rate, nm/min. |
| $Yb_3Al_5O_{12}$ | 1750 | 2 | vacuum | 0.1 | 0 | 0.8 |
| | 1800 | 4 | vacuum | 0.8 | 0 | 1.3 |
| | 1500 | 6 | $N_2 + H_2$ | 0.1 | 2 | 1.9 |
| | 1600 | 6 | $N_2$ | 0.8 | 2 | 2.5 |
| $Er_3Al_5O_{12}$ | 1700 | 2 | vacuum | 0.1 | 0 | 1.1 |
| | 1800 | 4 | vacuum | 0.7 | 0 | 1.7 |
| | 1500 | 6 | $N_2 + H_2$ | 0.1 | 2 | 2.3 |
| | 1600 | 6 | $N_2$ | 0.7 | 2 | 2.7 |

COMPARATIVE EXAMPLE

Sintered bodies of yttrium aluminum garnet, ytterbium aluminum garnet and erbium aluminum garnet, of which the porosity was substantially zero or about 4%, were prepared and ground and polished on the surface in substantially the same manner as in Example to have a surface roughness Ra of 0.1 or 0.8 μm for the yttrium aluminum garnet samples and 0.1 or 3 μm for the ytterbium and erbium aluminum garnet samples.

These sintered and surface-polished composite oxide bodies were subjected to the test of the etching rate in the same manner as in Example to give results shown in Table 2 which also indicates the sintering conditions, surface roughness and porosity.

TABLE 2

| Sample | Sintering conditions | | | Surface | | Etching |
| --- | --- | --- | --- | --- | --- | --- |
| | Temperature, ° C. | Time, hours | Atmosphere | roughness Ra, μm | Porosity, % | rate, nm/min. |
| $Y_3Al_5O_{12}$ | 1800 | 4 | vacuum | 0.1 | 0 | 4.4 |
| | 1800 | 4 | vacuum | 0.8 | 0 | 5.7 |
| $Yb_3Al_5O_{12}$ | 1600 | 0.5 | air | 0.1 | 4 | 5.6 |
| | 1800 | 0.5 | air | 3 | 0 | 6.5 |
| $Er_3Al_5O_{12}$ | 1600 | 0.5 | air | 0.1 | 4 | 4.8 |
| | 1800 | 0.5 | air | 3 | 0 | 7.1 |

As is understood from the results shown in Tables 1 and 2, the surface roughness and porosity of the sintered body are each an important factor affecting the etching rate which is large when the surface of the sintered body is too coarse or the porosity thereof is too large. On the other hand, the etching rate of the sintered bodies of yttrium aluminum garnet cannot be small enough even when the surface roughness thereof is sufficiently low and the porosity thereof is sufficiently small.

REFERENCE EXAMPLE

Sintered bodies of substantially zero porosity were prepared from the ytterbium aluminum garnet and erbium aluminum garnet powders in about the same manner as in Example by sintering at 1800° C. in vacuum for 2, 4 or 8 hours and they were ground and polished on the surface to give a surface roughness Ra of 0.1 μm.

The thus sintered and surface-polished samples were each subjected to an etching treatment and then to an electron microscopic examination to determine the grain size. Further, these samples were subjected to the measurement of the bending strength by the three-point method to give results shown in Table 3 together with the sintering time and grain diameter of the sintered bodies. As is understood from the results shown in the table, the bending strength of the sintered body is decreased as the size of the grains is increased by extending the sintering time.

TABLE 3

| Sample | Sintering time, hours | Grain diameter, μm | Bending strength, MPa |
|---|---|---|---|
| $Yb_3Al_5O_{12}$ | 2 | 10 | 380 |
|  | 4 | 36 | 290 |
|  | 8 | 65 | 150 |
| $Er_3Al_5O_{12}$ | 2 | 15 | 360 |
|  | 4 | 28 | 310 |
|  | 8 | 71 | 120 |

What is claimed is:

1. A corrosion-resistant material capable of withstanding attack of a halogen-containing corrosive gas or a plasma thereof, of which at least the surface layer is formed from a sintered body of a composite oxide having a crystalline structure of garnet and having a composition expressed by the formula $Ln_3Al_5O_{12}$, in which Ln is a combination of erbium, thulium, ytterbium and lutetium, the material having a surface roughness Ra not exceeding 1 μm and the sintered body having a porosity not exceeding 3%.

2. The corrosion-resistant material as claimed in claim 1 in which the grains forming the sintered body of the composite oxide have a diameter not exceeding 50 μm.

* * * * *